(12) United States Patent
O'Brien et al.

(10) Patent No.: US 8,129,024 B2
(45) Date of Patent: *Mar. 6, 2012

(54) MULTI-LAYER ROTATIONAL MOULDING

(75) Inventors: Gregory O'Brien, Downingtown, PA (US); Anthony Bonnet, Beaumont Le Roger (FR)

(73) Assignee: Arkema Inc., King of Prussia, PA (US)

( * ) Notice: Subject to any disclaimer, the term of this patent is extended or adjusted under 35 U.S.C. 154(b) by 1046 days.

This patent is subject to a terminal disclaimer.

(21) Appl. No.: 11/596,555

(22) PCT Filed: May 6, 2005

(86) PCT No.: PCT/US2005/015838
§ 371 (c)(1),
(2), (4) Date: Nov. 14, 2006

(87) PCT Pub. No.: WO2005/115753
PCT Pub. Date: Dec. 8, 2005

(65) Prior Publication Data
US 2007/0254174 A1    Nov. 1, 2007

Related U.S. Application Data

(60) Provisional application No. 60/572,797, filed on May 20, 2004.

(51) Int. Cl.
*B32B 27/36* (2006.01)
*B32B 27/30* (2006.01)
*B32B 27/32* (2006.01)
*B32B 27/40* (2006.01)
*B29C 53/36* (2006.01)

(52) U.S. Cl. ............ 428/412; 428/421; 428/424.6; 428/476.1; 428/483; 428/522; 428/523

(58) Field of Classification Search .......... 428/421, 428/424.6, 476.1, 483, 522, 523, 412; 264/339
See application file for complete search history.

(56) References Cited

U.S. PATENT DOCUMENTS

| | | | |
|---|---|---|---|
| 4,548,779 A * | 10/1985 | Steinberg et al. | 264/255 |
| 5,234,524 A | 8/1993 | Ozu et al. | |
| 5,457,159 A | 10/1995 | Fassina et al. | |
| 6,124,400 A | 9/2000 | Chien | |
| 6,352,784 B1 * | 3/2002 | Katagiri | 428/511 |
| 6,479,161 B1 * | 11/2002 | Araki et al. | 428/515 |
| 6,667,101 B2 * | 12/2003 | Silagy et al. | 428/411.1 |
| 7,241,817 B2 * | 7/2007 | Bonnet et al. | 522/156 |
| 2005/0118372 A1 * | 6/2005 | Bonnet et al. | 428/35.7 |
| 2006/0251835 A1 * | 11/2006 | Maziers et al. | 428/35.7 |

* cited by examiner

*Primary Examiner* — Thao T. Tran
(74) *Attorney, Agent, or Firm* — Thomas F. Roland

(57) ABSTRACT

This invention discloses a multilayer article prepared by rotational molding that comprises: a) a layer A comprising a functionalized fluoropolymer; b) a layer B comprising a non-fluoropolymer containing functional groups; and c) optionally a layer C prepared from a polymer that is dissimilar from that of layer A and that is similar to or dissimilar from that of layer B and is adjacent to layer A and/or layer B and, if present, is characterized in that it has good adhesion to layer A and/or to layer B and is not a blend of layer A and layer B.

8 Claims, No Drawings

MULTI-LAYER ROTATIONAL MOULDING

This application claims benefit, under U.S.C. §119 or §365 of US Provisional Application No. 60/572,797, filed May 20, 2004; and PCT/US2005/15838 filed May 6, 2005.

FIELD OF THE INVENTION

The invention relates to the field of multi-layer articles prepared by rotational moulding, and in particular to articles in which one layer is a functionalised fluoropolymer, and another layer is a non-fluoropolymer containing functional groups.

BACKGROUND OF THE INVENTION

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational moulding of metallocene polyethylenes" by D. Annechini, E. Takacs and J. Vlachopoulos in ANTEC, vol. 1, 2001.

Fluoropolymers, for example those based on vinylidene fluoride $CF_2=CH_2$ (VDF) such as PVDF (polyvinylidene fluoride), are known to offer excellent mechanical stability properties, very great chemical inertness and good ageing resistance. These qualities are exploited for various fields of application. For example, mention may be made of the manufacture of extruded or injection-moulded parts for the chemical engineering industry or for microelectronics, the use in the form of impermeable ducts for transporting gases or hydrocarbons, the production of films or coatings for protection in the architectural field, and the production of protective elements for electrical engineering uses. However, this chemical inertness of fluoropolymers means that it is difficult to bond them or combine them with other materials.

Polyethylene represents more than 80 percent of the polymers used in the rotomoulding market. This is due to the outstanding resistance of polyethylene to thermal degradation during processing, to its easy grinding, good flowability, and low temperature impact properties.

Multi-layer articles of polyolefins with fluoropolymers formed by the rotomolding process are described in European patent application EP 02079876.5.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

There is a need for multi-layer rotomolded article having a fluoropolymer layer, with improved bonding between the fluoropolymer layer and other layers of the article.

Surprising it has been found that functionalised fluoropolymers combined with functionalised non-fluoropolymers in a rotomolding process achieve excellent bonding between the layers.

SUMMARY OF THE INVENTION

It is an object of the present invention to prepare rotomoulded articles, having at least one functionalized fluoropolymer layer, having good adherence between layers of dissimilar material.

It is another object of the present invention to prepare rotomoulded articles having good permeation resistance, and/or chemical resistance.

It is a further aim of the present invention to prepare rotomoulded articles having a good thermal stability at elevated temperatures.

Accordingly, the present invention discloses a multilayer article prepared by rotational moulding that comprises:
a. a layer A comprising a functionalised fluoropolymer;
b. a layer B comprising a non-fluoropolymer containing functional groups; and
c. optionally a layer C prepared from a polymer that is dissimilar from that of layer A and that is similar to or dissimilar from that of layer B and is adjacent to layer A and/or layer B and, if present, is characterised in that it has good adhesion to layer A and/or to layer B and is not a blend of layer A and layer B.

DETAILED DESCRIPTION OF THE INVENTION

The invention relates to a multi-layer article prepared by rotational moulding, in which one layer is a functionalised fluoropolymer, and another layer is a non-fluoropolymer containing functional groups.

Fluoropolymers of the invention are any polymer having in its chain at least one monomer chosen from compounds that contain a vinyl group capable of opening in order to be polymerized and that contains, directly attached to this vinyl group, at least one fluorine atom, a fluoroalkyl group or a fluoroalkoxy group.

Examples of fluorinated monomers include, but are not limited to, vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoroalkyl vinyl ethers, such as perfluoro (methyl vinyl) ether (PMVE), perfluoro(ethyl vinyl) ether (PEVE) and perfluoro(propyl vinyl) ether (PPVE); perfluoro (1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_n CH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$- and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer; it may also include non-fluorinated monomers such as ethylene.

As an example, the fluoropolymer is chosen from:
homopolymers and copolymers of vinylidene fluoride (VDF) preferably containing, by weight, at least 50% VDF, the copolymer being chosen from chlorotrifluoroethylene (CTFE), hexafluoropropylene (HFP), trifluoroethylene (VF3) and tetrafluoroethylene (TFE);
homopolymers and copolymers of trifluoroethylene (VF3); and
copolymers, and especially terpolymers, combining the residues of chlorotrifluoroethylene (CTFE), tetrafluoroethylene (TFE), hexafluoropropylene (HFP) and/or ethylene units and optionally VDF and/or VF3 units.

Advantageously, the fluoropolymer is a poly(vinylidene fluoride) (PVDF) homopolymer or copolymer. Preferably, the PVDF contains, by weight, at least 50%, or preferably at least 75% and better still at least 85% VDF. The comonomer is advantageously HFP.

Advantageously, the PVDF has a viscosity ranging from 100 Pa.s to 5000 Pa.s, the viscosity being measured at 230° C. and a shear rate of 1 s$^{-1}$ using a parallel plate rheometer. These PVDFs are well suited to extrusion and to injection moulding. Preferably, the PVDF has a viscosity ranging from 300 Pa.s to 2000 Pa.s, the viscosity being measured at 230° C. with a shear rate of 1 s$^{-1}$ using a parallel plate rheometer.

PVDFs sold under the brand name KYNAR® 710 or 720 are perfectly suitable for this formulation.

By "functionalised fluoropolymer" as used herein means a fluoropolymer containing functional groups, such as, but not limited to, acids, anhydrides, alcohol, amines, silanes, or epoxy. The functional groups are added into the polymer though the use of functionalised comonomers, or by chemically altering the fluoropolymer after polymerisation, such as, but not limited to, grafting, oxidation, and reactive extrusion.

The PVDF may be completely or partly modified, that is to say functional groups are introduced thereinto, the purpose of which is to promote bonding between the composition and a substrate.

Advantageously, the modified PVDF is selected from:
  PVDFs grafted with an unsaturated monomer, the grafting being carried out by irradiation of a blend in the absence of oxygen;
  PVDFs irradiated in the presence of oxygen (these also being referred to as oxidized PVDFs 1); and
  dehydrofluorinated and then oxidized PVDFs (also referred to as oxidized PVDFs 2).

Oxidation of the fluoropolymer is described in patent application FR 03.09223, incorporated herein by reference. The process consists in irradiating the fluoropolymer in the presence of oxygen. The oxidized fluoropolymer thus obtained may be used as such or in a blend with at least one polymer chosen from the same, but unoxidized, fluoropolymer, another fluoropolymer and another, non-fluorinated polymer such as, for example, an acrylic polymer.

As regards the grafted PVDFs, these may be prepared by a method of grafting an unsaturated monomer onto the PVDF, in which:

a) the PVDF is melt-blended with the unsaturated monomer;

b) the blend obtained in a) is formed into films, sheets, granules or powder;

c) the products from step b) are subjected, in the absence of air, to photon (γ) or electron (β) irradiation with a dose between 1 and 20 Mrad; and d) the product obtained at c) is optionally treated in order to remove all or some of the unsaturated monomer that has not been grafted onto the PVDF.

With regard to the unsaturated grafting monomer, mention may be made, by way of examples, of carboxylic acids and their derivatives, acid chlorides, isocyanates, oxazolines, epoxides, amines and hydroxides. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids. Undecylenic acid may also be mentioned. Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo-[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methyl-bicyclo[2.2.1]hept-5-ene-2,2-dicarboxylic anhydrides.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Advantageously, maleic anhydride is used.

Grafting can also occur using organic metal salts. The process of the invention consists in melt-blending the fluoropolymer with the organic metal salt that is desired to graft onto the said fluoropolymer and then the mixture obtained, being in divided form such as granules, is irradiated in order to graft the organic metal salt onto the fluoropolymer.

Grafting of PVDF can also occur with unsaturated acid.

The outer layer of the multi-layer article may be layer A or layer B comprising homopolymers or copolymers of functional fluoropolymer as well as functionalised non-fluoronated polymers. In a preferred embodiment according to the present invention, optional layer C, if present is adjacent to either layer A or layer B but not between layer A and layer B.

U.S. Pat. No. 5,415,958, incorporated herein by reference describes a copolymer of VDF and maleic anhydride.

In a more preferred embodiment according to the present invention, the article has two layers wherein the external layer is a composition comprising polyolefin and a functionalised polyolefin and the internal layer comprises fluoropolymers containing functional groups.

The non-fluoropolymer containing functional groups, polymer B, of the invention could include, but is not limited to, functionalised polyolefins, such as polyethylene, polypropylene; polyamides; polyesters, functionalised acrylics, polyethylene terephthalate or butylene terephthalate, or liquid crystal polymer, or polycarbonates, or acrylics, or polyamides, or aromatic or aliphatic polyketones, or polyether ketones, or polyethylene vinyl alcohol, or polyphenylene sulfides and alloys thereof with themselves or other polymers, where said layer B polymer has reactive species or end-groups able to create bonds, and mixtures thereof. The non-fluoropolymer containing functional groups.polymer may be a blend of both functionalised and non-functionalized polymers. At least 2 percent by weight of the non-fluoropolymer is functionalized polymer. The polymer B may be a thermoplastic or thermoset polymer—provided it is capable of being rotomolded. Thermoplastic polymers are preferred. The polymer B could even be one that is polymerized in-situ in the rotomolder—such as PA6.

Functionalization of polymer B may be done by means known in the art, including, but not limited to, copolymerisation with functional monomers or reactive end-groups, alloying, and reactive extrusion.

Preferably, the composition of layer B comprises functionalised polyethylene (PE) or polypropylene (PP).

The article may contain additional layers for which the adherence is provided by conventional methods such as for example by a bonding layer.

The present invention also discloses a process for preparing a multilayer rotomoulded article by feeding in one shot all the material necessary for each layer.

It has been observed that in the rotomoulding process, the particles having the smallest diameter (the fines) reach the walls of the mould in the shortest time. It is therefore possible to combine differences in resin morphology and in resin melting temperature to prepare a two-layer rotomoulded article in one shot.

The present invention also discloses a one-shot process to prepare a two-layer article that comprises the steps of:
a) providing a non-fluoropolymer composition comprising from 0 to 98 wt % of non-fluoropolymer and from 100 to 2 wt % of non-fluoropolymer containing functional groups, said non-fluoropolymer composition having a melting point of less than that of the fluoropolymer;
b) providing a functionalised polyvinylidene fluoride (PVDF) having a melting point of more than that of the non-fluoropolymer containing functional groups;
c) physically mixing the two resins;
d) feeding the mix of step c) in the rotational moulder and keeping under rotation;
e) retrieving the rotomoulded article;
wherein the ratio of the particle diameter of the non-fluoropolymer composition to that of the fluoropolymer is at most 2:3 and the melting point of the non-fluoropolymer composition is at least 15° C. lower than that of the polivinylidene fluoride.

Preferably the non-fluoropolymer is polyethylene, where the melting point of the polyethylene composition is of at most 130° C. and the melting temperature of functionalised polivinylidene fluoride is of at least 155° C., more preferably of at least 160° C.

The resins can be used in three different forms:
pellets having a diameter of from 2 to 4 mm;
micro-pellets having a diameter of from 200 to 1500 microns;
powder having a diameter of from 100 to 1500 microns.
Preferably the ratio non-fluoropolymer/fluoropolymer of the particle diameters is at most 0.5.

The polyethylene composition particles, having the smallest size and the lowest temperature, are first separated by particle size difference and adhere to the mould first at the lowest temperatures. Subsequently, when the first layer is completely formed, the temperature increases and the functionalized polyvinylidene fluoride starts melting and adhering to the first layer.

In addition to temperature and granulometry, other rheological properties of the resins such as melt index and viscosity can be used to control the successive depositions.

In one embodiment, the functionalized polypropylene is a homopolymer or a random copolymer or a block copolymer or a heterogeneous two-phase copolymer of propylene preferably a metallocene-produced isotactic polypropylene miPP or a metallocene-produced syndiotactic polypropylene msPP.

The polyamides that can be used in the present invention are the products of condensation:
of one or more amino acids such as aminocaproic acid, 7-aminoheptanoic acid, 11-aminoundecanoic acid and 12-aminododecanoic acid of one or more lactams such as caprolactam, oenantholactam and lauryllactam;
of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.
As examples of polyamides, mention may be made of PA 6 and PA 6-6.

It is also advantageously possible to use copolyamides. Mention may be made of the copolyamides resulting from the condensation of at least two $\alpha,\omega$-aminocarboxylic acids or of two lactams or of one lactam and one $\alpha,\omega$-aminocarboxylic acid. Mention may also be made of the copolyamides resulting from the condensation of at least one $\alpha,\omega$-aminocarboxylic acid (or a lactam), at least one diamine and at least one dicarboxylic acid.

Advantageously, the copolyamide is chosen from PA 6/12 and PA 6/6-6.

Mixtures of polyamide and polyolefins can also be used as layer B. The polyamide is as disclosed hereabove. The polyolefin can be a functionalised or a non-functionalised polyolefin or can be a mixture of at least one functionalised and/or of at least one non-functionalised polyolefin.

A non-functionalised polyolefin is conventionally a homopolymer or copolymer of $\alpha$-olefins or of di-olefins such as, for example, ethylene, propylene, 1-butene, 1-octene or butadiene.

A functionalised polyolefin is a polyolefin grafted or copolymerised with a material that provides polarity and/or reactivity and it therefore depends upon the nature of the adjacent layers. It can be an $\alpha$-olefin polymer containing reactive units (functionalities); such reactive units are acid, anhydride or epoxy functions. By way of example, mention may be made of the above polyolefins grafted or co- or terpolymerized with unsaturated epoxides such as glycidyl (meth)acrylate, or with carboxylic acids or the corresponding salts or esters such as (meth)acrylic acid or alternatively with anhydrides of carboxylic acids such as maleic anhydride.

More generally, amine terminated materials can also be used in layer B and they are preferably selected from polyamide diamine (PAdiNH$_2$). According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end and an amine end.

The name diamine polyamide, PAdiNH$_2$, refers to a polyamide which satisfies the following criteria:
it has a certain amount of chains ending on both sides with all amine group (NH$_2$)
the amount of chains ending on both sides with an amine group (NH$_2$) is greater than that of diacid chains (if any)

the concentration of amine groups is greater overall than the concentration of acid groups a PAdiNH$_2$ is obtained by adding a diamine as chain limiter or, in the case of polyamides based on diamine and on diacid such as, for example, PA6-6, by adding more diamine comonomer than diacid comonomer.

The polyamides that can be used in layer B may also be impact-modified polyamides. Supple modifiers may be made, for example, of functionalised polyolefins, grafted aliphatic polyesters, optionally grafted copolymers containing polyether blocks and polyamide blocks, and copolymers of ethylene and of an alkyl (meth)acrylate and/or of a saturated vinylcarboxylic acid ester. The modifier may also be a polyolefin chain with polyamide grafts or polyamide oligomers thus having affinities with the polyolefins and the polyamides. The supple modifier may also be a block copolymer.

Foamed polyamides may also be used in layer B.

Layer B may further advantageously be prepared from polyurethane or from a composition comprising polyamide and ethylene/vinyl alcohol copolymers (EVOH), and more generally, from a composition comprising polyamide and a barrier layer.

The functionalised polyolefin is a polyolefin grafted or co-polymerized with a material that provides polarity and/or reactivity and it therefore depends upon the nature of the adjacent layers. A general description has been disclosed in a previous paragraph. Among the preferred functionalised polyolefins, one can cite ethylene/vinyl acetate copolymers (EVA), ethylene/acrylic ester copolymers such as methyl acrylate (EMA) or butyl acrylate (EBA), ethylene/acrylic ester/maleic anhydride (MAH) or glycidyl methacrylate (GMA) terpolymers, maleic anhydride grafted polyethylene, maleic anhydride grafted polypropylene, maleic anhydride grafted EVA or AMA, EVOH. Typical functionalised polyolefins are disclosed for example in EP-A-1104788, or in EP-A-1122060.

In the present invention, the polyolefin is preferably grafted with anhydride. Preferably the polyolefin is polyethylene or polypropylene, more preferably, it is polyethylene.

The composition of layer B comprising a functional polyolefin and a PO resin or a mixture of PO resins may either be prepared by physical mixing of the components or be provided as a powder blend of the components.

Other layers may be added either by repeating the present invention as many times as necessary and/or by using bonding layers where necessary.

The thickness of each layer is determined by the size of the final product, by the desired properties and by the cost: it can vary from 0.5 mm up to several cm.

The size of the rotomoulded articles varies from 0.5 L up to 50 m$^3$.

Multiple layers object can be prepared either by manual introduction of material during the moulding cycle or by the use of a drop-box.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:

the temperature at which the subsequent layer is added: it is critical for determining the wall thickness of the previous skin formed and how well the two layers may be bound together;

the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce multilayer rotomoulded articles depends upon the number of layers and upon the mass injected for each layer. Typically for a double skin article wherein each skin has a thickness of about 3 mm, the total cycle time is from 60 to 80 minutes.

The present invention also discloses a process for preparing a two-layer rotomoulded article wherein layer B is the outer layer and is a non-fluoropolymer containing functional groups composition and wherein layer A is the inner layer and is a fluoropolymer containing functional groups, said process comprising the steps of:

a) providing the non-fluoropolymer composition for layer B;

b) increasing the peak internal air temperature (PIAT) to a temperature that is from 15 to 50° C. higher than the melting temperature of the composition of layer B in order to fully melt said layer B;

c) adding the composition for layer A using a drop-box;

d) increasing the PIAT to a temperature that is superior to the melting temperature of the composition of layer A in order to fully melt said layer A;

e) cooling down with water spray in order to solidify the resins;

f) retrieving the rotomoulded article.

The present invention is particularly useful for preparing fuel tanks for cars and lorries with a size ranging from 40 L to 600 L and more generally for preparing complex structures.

The present invention is also useful for preparing containers for transporting nitric acid or other chemicals when the internal layer is prepared with polyvinylidene fluoride.

EXAMPLES

Several rotomoulded articles were prepared as follows.

All test mouldings were carried out on the ROTOSPEED rotational moulding machine. It is a carrousel-style machine with offset arm, LPG burner arm with a burner capacity of 523 kW/hr, air fan cooling, and/or water spray cooling and a maximum plate diameter of 1.5 m.

An aluminum box mould was used to produce the test mouldings. The mould was equipped with a draft angle to facilitate demoulding and the bi-layer articles were prepared by the use of a drop box. The drop box was filled with the material needed for the first layer and then attached to the lid of the mould. A pneumatic ram in the drop box held the material in place until the required temperature was reached, the ram was then activated and the material was dropped in. That operation was repeated for each layer under the conditions described below.

The tests were carried out on two types of material. The mould was removed from the oven at different peak internal temperatures. The moulding conditions for the trials were as follows:

oven temperature: 300° C.

rotation ratio: 4:1 cooling medium: forced air
preheated arm and mould
rotolog unit n°5/rotolog software version 2.7.

All cycle times were taken from the same start and end points to allow for easier comparison of the various stages in the internal air temperature traces.

Example 1

A grafted homopolymer PVDF is produced that contains 5000 ppm of maleic anhydride. The grafted homopolymer has a zero shear viscosity of less than 5000 sec-1 at 235° C. The starting PVDF could be Kynar 710 supplied by Atofina Chemicals. A melt blend of 70% by weight of metallocene polyethylene (mPE) with a density of 0.940 g/cc and an MFR of 8.0 designed for rotomolding is melt mixed with a 30% by weight of a terpolymer of ethylene, methyl acrylate and glycidyl methacrylate. This polymer could be one of the Lotader products from Atofina Chemicals (AX8840, AX 8900 or AX8950). Both polymers are ground to a rotomolding powder with a peak particle size between 250 and 500 microns.

The metallocene polyethylene is added to a mold and rotomolding is started using a 300° C. oven temperature and a 4:1 rotation ratio on the primary and secondary axis. When the peak internal air temperature reaches 130 to 170° C. (the Polyethylene layer is formed but still viscous), the PVDF rotomolding powder is added to the mold either manually or with a drop-box. The rotomolding is continued until the peak internal air temperature reaches 210 to 235 C and the PVDF layer is fully formed, the mold is removed and cooled using both air and water mist cooling. The water mist cooling must be adequate to crystallize the mPE before the PVDF. A tank is produced with integral two well defined layers with good adhesion at the interface.

Example 2

The same moulding experiment is conducted as in experiment. The mPE used is not modified with functional polyethylene. The PVDF is not functionalized. No adhesion is seen at the interface in this experiment.

Example 3

The same two materials as used in example 1 are used, but the grafted PVDF powder is added to the mold first, and an internal air temperature of 180 to 220° C. is reached when the modified mPE powder is added to the mold. The internal air temperature is allowed to reach 210 to 220 C. The mold is removed from the oven and either air cooling or air plus water cooling can be used. A two layer tank is produced with good interfacial adhesion.

Example 4

A PVDF homopolymer is melt mixed with a acrylic polymer containing anhydride functionality. The PVDF can be Kynar 710, the acrylic is a anhydride functional acrylic. The same modified polyethylene that is used in example 1 is used for with the same process. The result is a two layer tank with good adhesion.

Example 5

Could be a blend of Kynar 3120 low viscosity with a grafted Kynar 710. Ratio depends on grafting level of Kynar 710. This blend produces a high impact product. The same modified mPE and process from example 1 is used to produce a two-layer tank with higher toughness.

The invention claimed is:

1. A multilayer hollow article prepared by rotational moulding that consists of:
    a) an inner surface layer A comprising a functionalized fluoropolymer, wherein said functionalized fluoropolymer is a functionalized polyvinylidene fluoride (PVDF) that has been irradiation grafted with maleic anhydride;
    an outer surface layer B comprising a non-fluoropolymer containing functional groups, polyester, polyethylene terephthalate, butylene terephthalate, liquid crystal polymer, polycarbonates, acrylics, polyamides, aromatic or aliphatic polyketones, aromatic or aliphatic polyether ketones, or polyphenylene sulfides, polyurethanes, and alloys thereof, characterized in that said layer B polymer has reactive species or end-groups able to create bonds.

2. The multilayer article according to claim 1 wherein each layer has a thickness of at least 0.5 mm.

3. The multilayer rotomoulded article according to claim 1, wherein said multilayer article is a fuel tank, chemical tank or hydraulic tank.

4. The rotomoulded article according to claim 1, wherein said layer B comprises a functionalized polyolefin.

5. A process for preparing the multilayer rotomoulded article according to claim 1 by feeding in one shot the material necessary for each one layer.

6. The process of claim 5 for preparing a two-layer rotomoulded article wherein layer B is the outer layer and comprises a non-fluoropolymer containing functional groups composition and layer A is the inner layer and comprises fluoropolymer containing functional groups, said process comprising the steps of:
    a) providing a non-fluoropolymer resin composition comprising from 0 to 98 wt % of non-functionalized polymer and from 100 to 2 wt % of functionalised polymer, said non-fluoropolymer having a melting point of less than 145° C.;
    b) providing a functional fluoropolymer resin having a melting point of at least 145° C.;
    c) physically mixing the resin composition from a) with the resin from b);
    d) feeding the mix of step c) in the rotational moulder and keeping under rotation;
    e) retrieving the rotomoulded article;
    wherein the ratio of the particle diameter of the non-fluorinated polymer composition to that of the fluoropolymer is at most 2:3 and the melting point of the non-fluoropolymer composition is at least 15° C. lower than that of the fluoropolymer.

7. A process for preparing a two-layer rotomoulded article according to claim 1, wherein layer B is the outer layer and comprises a non-fluoropolymer containing functional groups composition and wherein layer A is the inner layer and comprises a fluoropolymer containing functional groups, said process comprising the steps of:
    a) providing the non-fluoropolymer composition for layer B;
    b) increasing the peak internal air temperature (PIAT) to a temperature that is from 15 to 50° C. higher than the melting temperature of the composition of layer B in order to fully melt said layer B;
    c) adding the composition for layer A using a drop-box or hand addition;

d) increasing the PIAT to a temperature that is superior to the melting temperature of the composition of layer A in order to fully melt said layer A;
e) cooling down the composition to solidify the resins;
f) retrieving the rotomoulded article.

8. The process of claim 7 further comprising a step between steps d) and e) of using a water spray cooling for solidifying the rotomoulded article in order to reduce shrinkage voids.

* * * * *